United States Patent Office.

SARAH AMANDA REYBERT, OF PLAINFIELD, NEW JERSEY.

Letters Patent No. 112,632, dated March 14, 1871.

IMPROVEMENT IN HAIR-TONICS.

The Schedule referred to in these Letters Patent and making part of the same.

*To all whom it may concern:*

Be it known that I, SARAH AMANDA REYBERT, of Plainfield, in the county of Somerset and State of New Jersey, have invented a new and useful Improvement in a Vegetable Hair-Tonic; and I do hereby declare that the following is a full, clear, and exact description thereof, which will enable others skilled in the art to make and use the same.

My invention has for its object to furnish an improved tonic for promoting the growth of the hair and preventing it from falling out, which will restore gray hair to its original color, will remove dandruff and all eruptions of the scalp, making the hair soft and glossy, and serving as a beautiful hair-dressing, and which shall be composed mainly of vegetable ingredients; and It consists of the tonic, composed of the ingredients and prepared in the manner hereinafter more fully set forth and described.

In preparing my improved tonic I take alcohol, (95 per cent.,) three gallons, and place in it a pound of dried lobelia, allowing it to steep about a week. It is then strained and filtered, and there are added to it one gallon of best castor-oil, three ounces of the tincture of cantharides, twelve ounces of the tincture of borax, twelve ounces of Castile-soap, six ounces of the tincture of sage, and a small quantity of the oil of bergamot or other desired perfume.

These ingredients are thoroughly mixed, and the mixture is at once bottled and is ready for use.

Having thus described my invention,

I claim as new and desire to secure by Letters Patent—

An improved vegetable hair-tonic, prepared of the ingredients and in the manner substantially as herein set forth and described.

SARAH AMANDA REYBERT.

Witnesses:
JAMES VERDON,
SARAH DE CAMP.